(12) United States Patent
Yamamoto et al.

(10) Patent No.: US 9,459,448 B2
(45) Date of Patent: Oct. 4, 2016

(54) BEAM SCANNING TYPE DISPLAY APPARATUS

(71) Applicant: HITACHI MAXELL, LTD., Osaka (JP)

(72) Inventors: Shoji Yamamoto, Tokyo (JP); Yoshiho Seo, Tokyo (JP); Keiichi Betsui, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/105,318

(22) Filed: Dec. 13, 2013

(65) Prior Publication Data

US 2014/0240808 A1 Aug. 28, 2014

(30) Foreign Application Priority Data

Feb. 27, 2013 (JP) .................................. 2013-036584

(51) Int. Cl.
  *G02B 26/10* (2006.01)
  *H04N 9/31* (2006.01)
  *G02B 27/00* (2006.01)
  *G02B 26/08* (2006.01)

(52) U.S. Cl.
  CPC ......... *G02B 26/101* (2013.01); *G02B 27/0031* (2013.01); *H04N 9/3129* (2013.01); *H04N 9/3182* (2013.01); *H04N 9/3185* (2013.01); *G02B 26/0833* (2013.01); *G02B 26/0841* (2013.01); *G02B 26/0858* (2013.01); *G02B 26/105* (2013.01)

(58) Field of Classification Search
  CPC .............. G02B 26/101; G02B 26/105; G02B 26/0858; G02B 26/0833; G02B 26/0841
  USPC ........ 359/198.1–199.1, 223.1–224.2
  See application file for complete search history.

(56) References Cited

U.S. PATENT DOCUMENTS

| | | | | |
|---|---|---|---|---|
| 2009/0059183 | A1* | 3/2009 | Tejima | G01C 3/08 353/69 |
| 2009/0237622 | A1 | 9/2009 | Nishioka et al. | |
| 2012/0032069 | A1* | 2/2012 | Miyazono et al. | 250/234 |
| 2013/0033732 | A1* | 2/2013 | Davis et al. | 359/198.1 |

FOREIGN PATENT DOCUMENTS

| | | |
|---|---|---|
| CN | 101540920 A | 9/2009 |
| JP | 2008-268645 | 11/2008 |

OTHER PUBLICATIONS

Office Action, mailed Nov. 19, 2015, which issued during the prosecution of Chinese Patent Application No. 201310723752.6, which corresponds to the present application.

* cited by examiner

*Primary Examiner* — Scott J Sugarman
*Assistant Examiner* — Alberto Betancourt
(74) *Attorney, Agent, or Firm* — Baker Botts, L.L.P.

(57) ABSTRACT

A beam scanning type display apparatus includes a reflection angle variable mirror that scans a beam light, at least two light detectors disposed at a predetermined distance in a beam scanning direction of the mirror that detects a light amount of screen reflection light, a distortion correction calculation unit that obtains a drive correction value of the mirror by calculating an irradiation distance and a screen inclination, from a light amount of a reflection light detected by the light detectors at two different scanning timings and an inclination angle of the mirror at this time, and a mirror driving unit that controls an inclination angle of the mirror by the drive correction value. A drive correction value of the mirror driving unit is obtained at a plurality of timings of a scanning period of beam light, and beam light is scanned at the corrected inclination angle of the mirror.

11 Claims, 12 Drawing Sheets

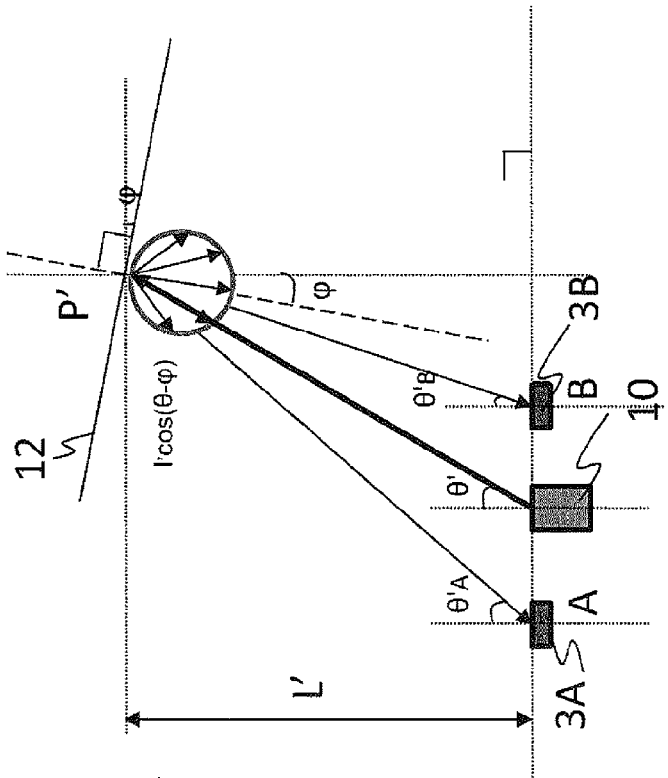
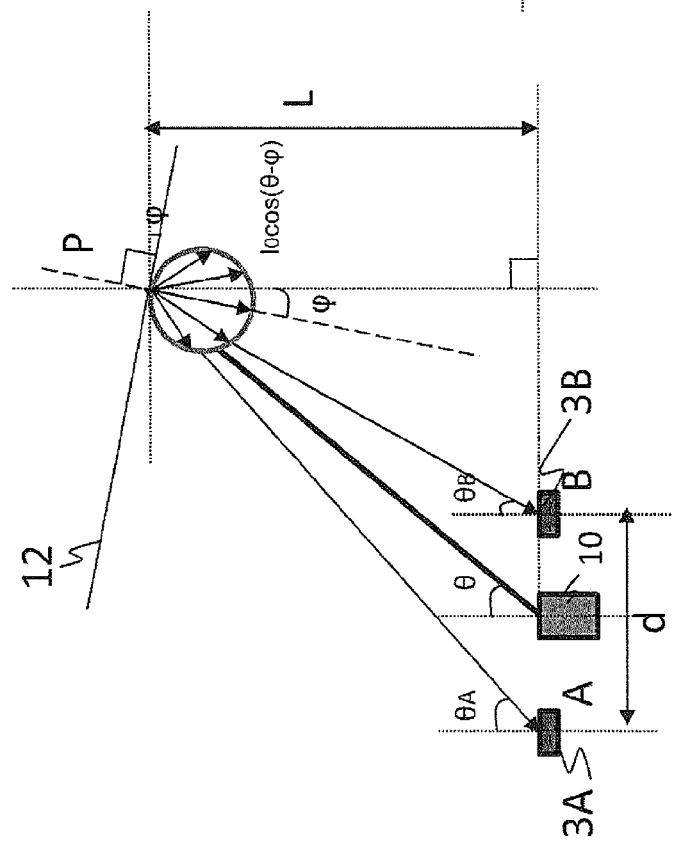

DETECTION SEQUENCE

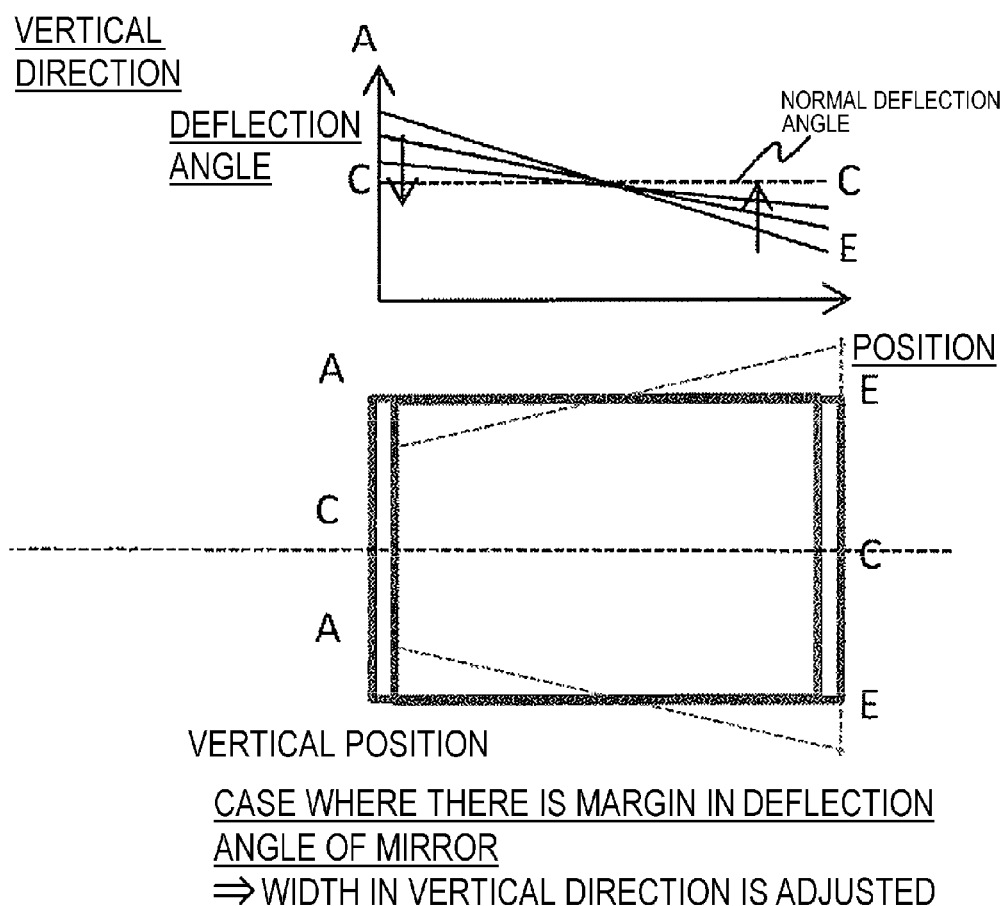

CASE WHERE THERE IS NO MARGIN IN DEFLECTION ANGLE OF MIRROR
⇒ADJUSTED TO WIDTH OF LEFT EDGE

BEAM SCANNING TYPE DISPLAY APPARATUS

CROSS-REFERENCE

This application claims the priority of Japanese Patent Application No. 2013-036584 filed on Feb. 27, 2013, which is incorporated herein by reference in its entirety.

BACKGROUND OF THE INVENTION

1. Field of the Invention

The present invention relates to an irradiation display apparatus which displays an image by radiating beam light two-dimensionally and a technology of detecting an inclination and a surface shape of an irradiated surface and correcting an image distortion.

2. Background Art

In recent years, light emitting diodes such as LEDs and laser light sources have been used as light sources of three primary colors of RGB (Red, Green and Blue), and projection type image display apparatuses (hereinafter, referred to as "projector") which form an image by raster-scanning the light emitted from the light sources have attracted attention.

For example, the projector includes three laser light sources of three primary colors of RGB, a collimator lens which approximately collimates a light emitted from each laser light source, a synthesizing prism which synthesizes the approximately collimated laser light of each color, and a reflection angle variable mirror such as an MEMS mirror which two-dimensionally scans the synthesized laser light. The laser light source of each color is modulated and driven in synchronism with an inclination angle of the reflection angle variable mirror depending on an image to be formed, and the modulated laser light is reflected by the reflection angle variable mirror and an irradiation screen is scanned by the modulated laser light so as to perform an image display. Since the laser light is approximately collimated, even if a distance to a projected surface changes, it is possible to display an image of a good quality rarely being out-of-focus.

However, since there is a beam waist in laser light in practice and an angular speed of the reflection angle variable mirror is constant, in a case of displaying an image at a distance different from a predetermined irradiation distance, the size of a beam spot of the laser light is not coincident with the pixel pitch of an image and thus an image of a good quality is not obtained. Particularly, in a case where laser light is radiated obliquely onto an irradiation screen, an image distortion such as a trapezoidal distortion occurs.

Therefore, it is necessary to measure an irradiation distance to the irradiation screen and to perform a correction depending on the distance in order to display an image of a good quality. JP-A-2008-268645 discloses a configuration in which a two-dimensional position sensitive light detector (PSD) which detects a light amount centroid of a light spot is provided, the sensor receives the light which is reflected and scattered on a projected surface of laser light scanned by the reflection angle variable mirror, a distance between a main body of an image projection apparatus and a projected object is calculated from obtained position information, and the position of a beam waist in divergent angle changing means is optimized based on the calculation result, and this configuration enables an image projection of a good quality.

SUMMARY OF THE INVENTION

However, in a technology disclosed in JP-A-2008-268645, since an irradiation distance is measured by a triangulation method using a two-dimensional position sensitive light detector (PSD), a space for guiding light reflected by an irradiation screen to the two-dimensional position sensitive light detector (PSD) is necessary. This results in a problem in that an irradiation device becomes large.

Further, only a flat irradiation surface is disclosed as a surface to be corrected, but an irradiation surface having the uneven surface and a color shading is not considered. Furthermore, in a case where the irradiated surface is a curved surface or has unevenness, there is a problem in that distortion correction is difficult because a projected image expands and contracts.

An object of the invention is to solve the problems described above and to provide a beam scanning type display apparatus which can measure an irradiation distance in a more space saving manner and perform image correction by detecting various irradiation surface shapes.

To solve the above problems, provided is a beam scanning type display apparatus of the invention which performs an image display on a screen by two-dimensionally scanning a beam light from a light source, including a light source driving unit that drives the light source; a reflection angle variable mirror that performs beam scanning by reflecting a beam light from the light source; at least two light detectors which detect a light amount of screen reflection light of the beam light, the light detectors being disposed at a predetermined distance in a beam scanning direction of the reflection angle variable mirror; a distortion correction calculation unit that obtains a drive correction value of the reflection angle variable mirror by calculating an irradiation distance to an irradiation point and a screen inclination of the irradiation point, from a light amount of a reflection light which is detected by the light detectors at two different scanning timings and a mirror inclination angle of the reflection angle variable mirror at this time; and a mirror driving unit that controls an inclination angle of the reflection angle variable mirror by the drive correction value, in which the drive correction value of the mirror driving unit is obtained at a plurality of timings of a scanning period of beam light, and the beam light is scanned at the inclination angle of the corrected reflection angle variable mirror.

Further, the distortion correction calculation unit calculates a light intensity value from a light amount of reflection light detected by the light detectors and a mirror inclination angle of the reflection angle variable mirror at this time, and the light source driving unit is corrected and driven based on the calculated light intensity value.

According to the invention, since an image correction is performed by detecting color shading and an uneven shape of an irradiated surface (screen), it is possible to display an irradiation image having a small distortion.

BRIEF DESCRIPTION OF THE DRAWINGS

FIGS. 3A and 3B are diagrams showing a principle of detecting a distance and an inclination when the screen is inclined by $\phi$.

FIG. 10C is a diagram showing an example of a correction method in a vertical direction for correcting the inclination.

DETAILED DESCRIPTION OF THE INVENTION

Hereinafter, an embodiment of the invention will be described with reference to the drawings.

Figure 1:
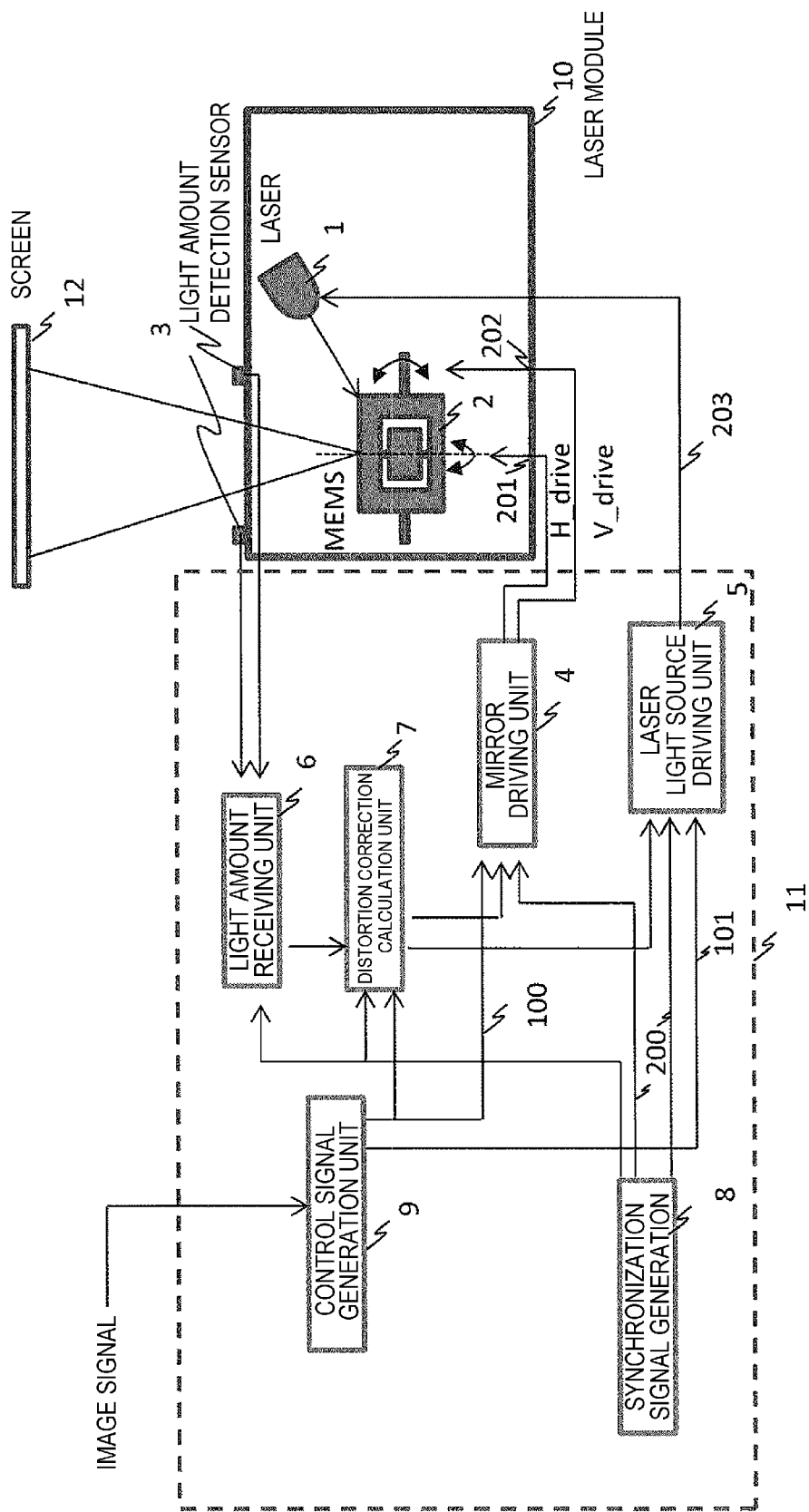
FIG. 1 is a configuration diagram of an irradiation device of the present embodiment.

FIG. 1 is a configuration diagram of an irradiation device of the present embodiment. The irradiation device of the embodiment is configured of a laser module 10 and a driving substrate 11. The laser module 10 includes a laser light source 1 and a reflection angle variable mirror 2. The driving substrate 11 includes a mirror driving unit 4, a laser light source driving unit 5, a light amount receiving unit 6, a distortion correction calculation unit 7, a synchronization signal generation unit 8, and a control signal generation unit 9.

The light amount detection sensor 3 is disposed outside of the housing of the laser module 10, and the incident surface of the sensor faces the screen 12 side. Although described in detail later, at least two light amount detection sensors 3 are arranged at a predetermined distance in either the horizontal direction with respect to a vertical direction scanning axis (hereinafter, referred to as a horizontal direction) or a vertical direction with respect to the vertical scanning axis (hereinafter, referred to as a vertical direction) of the reflection angle variable mirror 2. Here, when the sensors are disposed in both of the vertical direction and the horizontal direction, it is not necessary to dispose two sensors in each of the vertical and horizontal directions, and the invention can be implemented by three light amount detection sensors 3 while one sensor is shared. Moreover, a lens may be used for the light amount detection sensor 3. It is possible to receive intense light by condensing light diffused by the objects, thereby extending the measurement range of the light amount detection sensor 3.

Next, the operation of the driving substrate 11 and the laser module 10 will be described. The control signal generation unit 9 of the driving substrate 11 generates a mirror driving unit control signal 100 and a laser light source driving unit control signal 101 from an input image signal of the irradiation device. The generated laser light source driving unit control signal 101 and a synchronization signal 200 generated in the synchronization signal generation unit 8 are input to the laser light source driving unit 5. The laser light source driving unit 5 generates a laser driving signal 203 in response to the laser light source driving unit control signal 101 and the synchronization signal 200 that are input and the light amount of the laser light source 1 is adjusted based on a signal level and an application time of the laser driving signal 203.

The mirror driving unit control signal 100 and the synchronization signal 200 are input to the mirror driving unit 4. The mirror driving unit 4 generates a horizontal direction driving signal 201 and a vertical driving signal 202 in response to the mirror driving unit control signal 100 and the synchronization signal 200. The inclination angles of the reflection angle variable mirror 2 in the horizontal direction and the vertical direction are controlled by the horizontal direction driving signal 201 and the vertical driving signal 202, respectively.

In the manner described above, the light emission amount of the laser light source 1 and the inclination angle of the reflection angle variable mirror 2 are synchronously controlled by the operation of the driving substrate 11 and the laser light is scanned two-dimensionally. Thus, an image is formed on an irradiated surface (screen 12). In addition, only one laser light source 1 is shown in FIG. 1, a color image can be realized by using laser light sources of three colors R, G and B.

Although an image display on the irradiated surface (screen 12) is performed in the manner described above, a distortion may occur in an irradiation image due to the surface shape or the surface inclination of the irradiated surface. In the present embodiment, the distance to and the inclination of an object to be irradiated (screen 12) are calculated by a sensor and the correction drive of the reflection angle variable mirror is performed according to the calculation result.

Figure 2C:
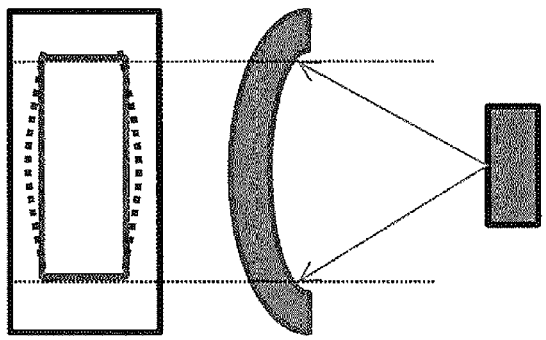
FIGS. 2A to 2C are diagrams showing image distortions when a rectangular shape is displayed on a screen.
Figure 2B:
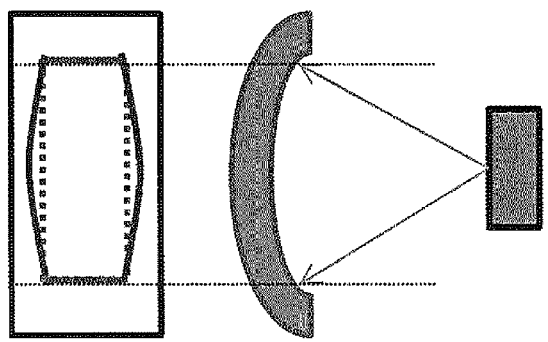
Figure 2A:
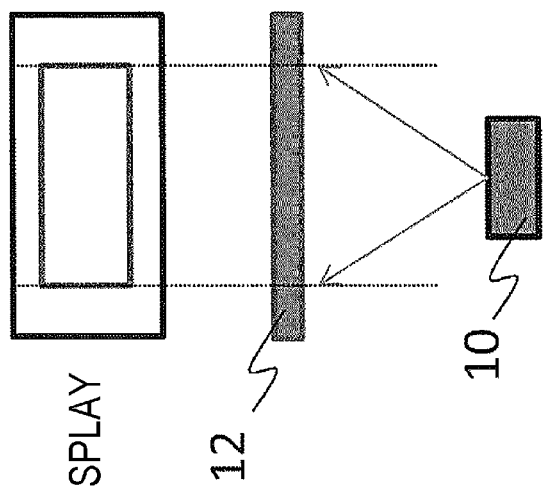

FIGS. 2A to 2C are diagrams showing image distortions caused when a rectangular shape is projected and displayed on the irradiated surface (screen 12). FIG. 2A is a diagram showing a display when the irradiated surface is flat and the surface is perpendicular to the optical axis direction of the laser module 10. FIG. 2B is a diagram showing a display when the irradiated surface is concave with respect to the laser module 10. FIG. 2C is a diagram showing the effect of the distortion correction against the irradiated surface of FIG. 2B.

As shown in FIG. 2A, it is assumed that when the irradiated surface (screen 12) is flat, the rectangular shape is displayed. Strictly speaking, an irradiation distance of the laser light to the irradiated surface (screen 12) is changed by the irradiation angle of the reflection angle variable mirror. Therefore, a few image distortions occur in a projection image, but they are not at a level that cannot be recognized. Even in such a case, although described in detail later, the correction of the image distortion can be performed by the present embodiment.

In FIG. 2B, since the irradiated surface (screen 12) has a concave shape, an image distortion which has been expanded in the center portion of the irradiated surface (screen 12) occurs. Therefore, a desired image cannot be displayed and image quality is deteriorated. The invention detects an irradiation distance, senses an uneven shape including the inclination of irradiated surface (screen 12) and performs an image distortion correction as shown in FIG. 2C.

In the following description, a detection method of an irradiation distance will be described. Generally, a Time of Flight (TOF) method which detects the reflected light by a light detection sensor for the light reflected from the irradiated surface being provided, measures a time from a projection time of the projection light to the detection time of the reflected light, and obtains a distance from the flight time of the light, and a triangulation method by a two-dimensional position sensitive light detector (PSD) described in JP-A-2008-268645 have been known for the detection of the irradiation distance. The invention detects the inclination and projection distance by detecting the angle of light emitted from the light source 1 and the amount of light reflected from the irradiated surface.

FIGS. 3A and 3B are diagrams for explaining a principle of detecting a distance and an inclination in an inclined surface. FIG. 3A shows an optical path of a laser light emitted at an angle θ from the laser module 10 to the irradiation point P and the reflected light from the irradiation point P of the screen 12 when the irradiated surface (screen 12) is inclined by φ. FIG. 3B is a diagram showing reflection from the screen when the reflection angle variable mirror 2 emits laser light at different angle θ' (different scanning timing) to a irradiation point P'.

Here, L and L' indicate irradiation distances to the irradiation points P and P', respectively. The laser light is emitted from the laser module 10 at an angle θ or angle θ', and radiated to the points P and P' on the screen of the distance L and L'. The radiated light is diffused by the Lambertian and reflected on the surface of the screen 12. The diffused light is radiated to the light amount detection sensors 3a and 3b which are disposed on the both sides of the scanning direction of the laser module 10 (more specifically, the both sides of the reflection angle variable mirror 2) at a distance of d/2. The light amount detection sensors 3a and 3b detect the light amounts of the radiated light as the light amounts A and B, respectively.

Since the light reflected at the point P on the screen 12 is diffused by the Lambertian, assuming that the intensity of the incident light of the laser light source is $I_0$, the intensity of the reflected light is represented by the following expression.

$$I = I_0 \cos(\theta - \phi)$$ Expression 1

By using Expression 1, assuming the angles formed by directions of the lights emitted from the screen 12 with respect to a line perpendicular to the surfaces of the light amount detection sensors 3a and 3b of FIG. 3 as θA and θB, respectively, the reflection lights satisfy the relationships represented by the following expressions.

$$3a: I_0 \frac{1}{L^2} \cos^3\theta_A \cos(\theta_A - \varphi) = A, \theta_A = \tan^{-1}\left(\tan\theta + \frac{d}{2L}\right)$$ Expression 2

$$3b: I_0 \frac{1}{L^2} \cos^3\theta_B \cos(\theta_B - \varphi) = B, \theta_B = \tan^{-1}\left(\tan\theta - \frac{d}{2L}\right)$$ Expression 3

Similarly, when the scanning timing is different and the emission angle is θ', assuming the incident angles of the light amount detection sensors 3a and 3b respectively as θ' A and θ' B, the reflection lights satisfy the relationships represented by the following expressions.

$$3a: I' \frac{1}{L'^2} \cos^3\theta'_A \cos(\theta'_A - \varphi) = A', \theta'_A = \tan^{-1}\left(\tan\theta' + \frac{d}{2L'}\right)$$ Expression 4

$$3b: I' \frac{1}{L'^2} \cos^3\theta'_B \cos(\theta'_B - \varphi) = B', \theta'_B = \tan^{-1}\left(\tan\theta' - \frac{d}{2L'}\right)$$ Expression 5

Figure 4:
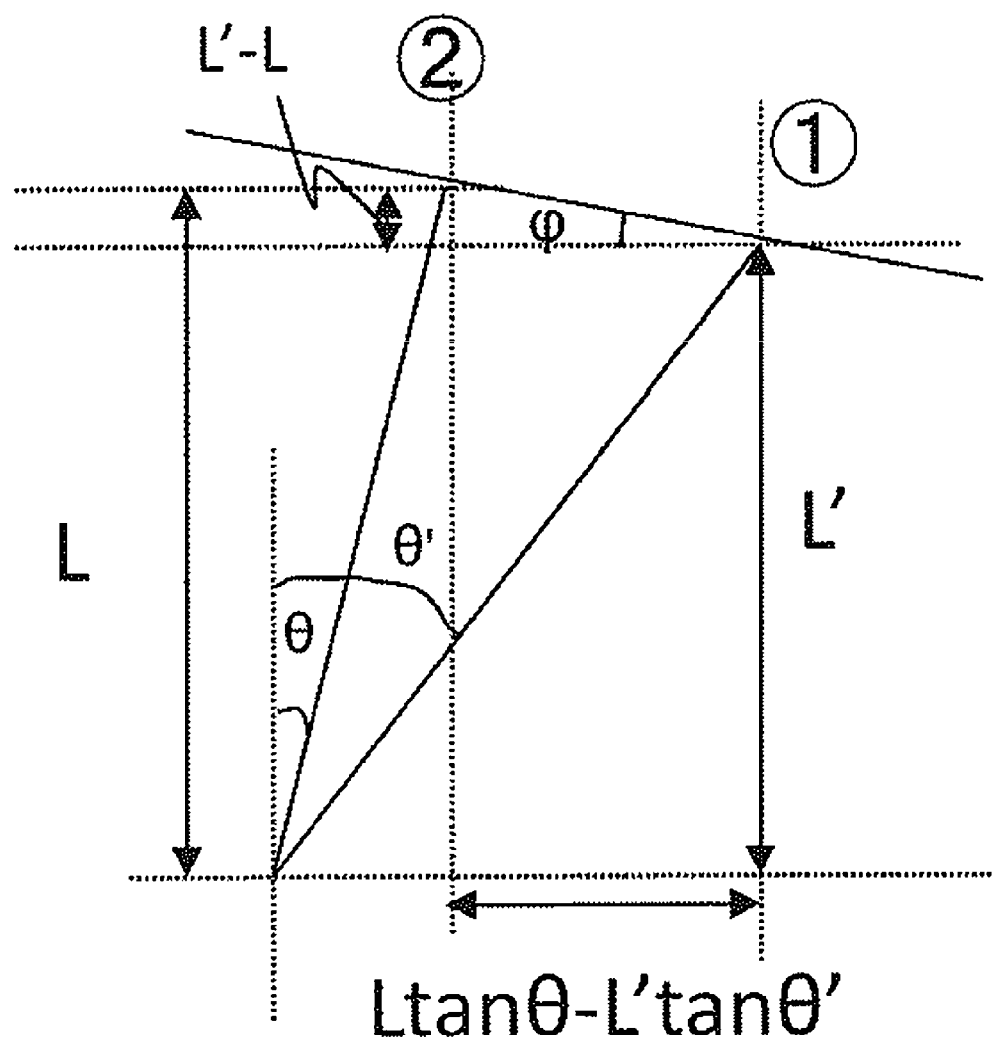
FIG. 4 is an enlarged view of a vicinity of an irradiated surface.

FIG. 4 is a diagram showing a relationship of the emission angles of the light radiated from the laser module 10 and the irradiation distances of two different points on the screen 12 which are slightly away from each other, made by the radiation of light from the laser module 10. If the mirror scanning timings are close, the distance between two irradiation points becomes small and the shape of the irradiated surface (screen 12) during that time can be regarded as a straight line. At this time, assuming the inclination of the irradiated surface (screen 12) as φ, the relationship between the emission angle θ and the irradiation distance L is represented by the following expression.

$$\varphi = \tan^{-1}\left(\frac{L' - L}{L\tan\theta - L'\tan\theta'}\right)$$ Expression 6

Here, since the angles θ and θ' corresponding to the mirror scanning of the laser module 10 are determined by the scanning timings, if L and L' are determined, φ can be calculated. In addition, Expressions 2 to 5 described above have four parameters ($I_0$, I', L and L') for the four expressions.

From the above description, by obtaining the measurement quantity of two light amounts A, A', B, and B' in the different mirror scanning timings of a predetermined laser module 10, the intensities $I_0$ and I' and the distances L and L' can be calculated based on Expressions 2 to 6. The distance from the laser module 10 to the screen 12 and the inclination of the screen 12 and the reflection intensity can be obtained by performing the procedure described above on the mirror scanning of the laser module 10. For example, in one scanning timing, if it is assumed that d=30 mm, θ=10° and θ'=8.7°, and A=30.096, B=29.939, A'=28.978 and B'=28.662 are obtained, it is established that L=500 mm, L'=510 mm, and φ=45°.

By obtaining the intensity of the radiation light which is emitted at different angles θ and θ' from the laser module 10 and is reflected on the screen 12 in this manner, it is possible to obtain the distance to the screen 12 and the inclination thereof. The shape figure of the projected surface can be obtained by performing the procedure described above over the scanning direction of the laser light. This is applicable to the curved surface and the uneven surface because the inclination of the curved surface and the uneven surface is regarded as a straight line in a small area by reducing the angle difference Δθ=(θ'−θ) of two points to be irradiated.

Although it is possible to detect the inclination and the surface shape of the irradiated surface (screen) by the method described above, in addition, this method is equally applicable to the detection of a surface having a different reflectivity that causes uneven brightness of the irradiated surface (screen), for example, a surface having uneven light and shade. The intensity of the laser light is corrected by detecting the reflection intensity at each position, thereby allowing the influence of uneven brightness of the irradiated surface (screen) to be reduced. Hereinafter, the detection method will be described in detail.

Figure 5:
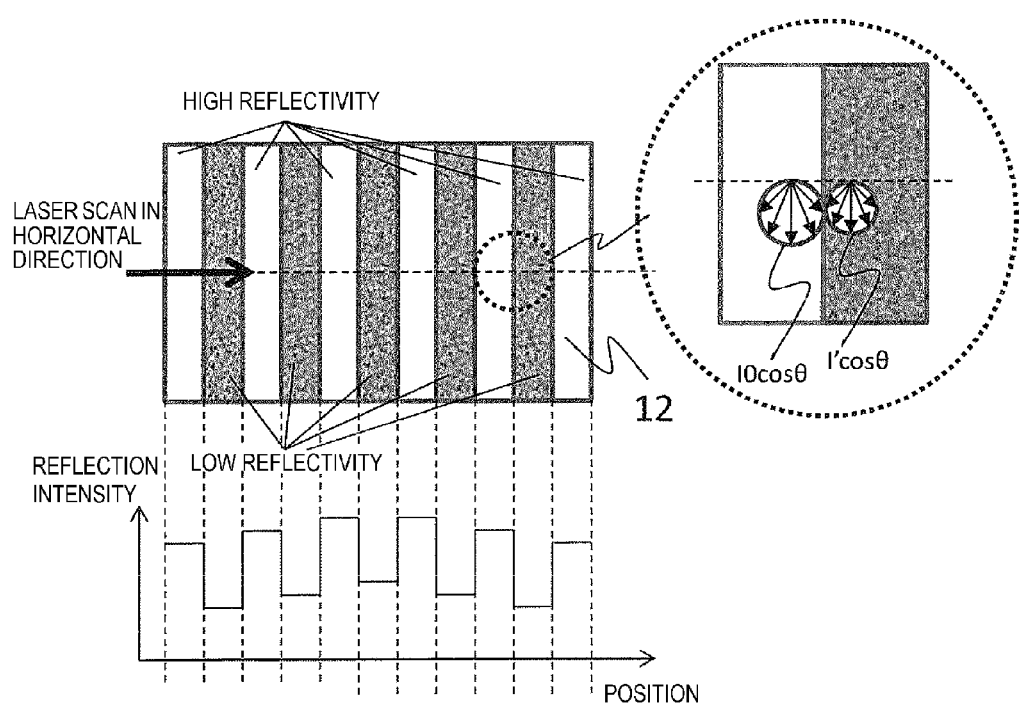
FIG. 5 is a diagram showing the screen with a surface having a different reflectivity.

FIG. 5 is a diagram showing an example of a screen 12 with a surface having a different reflectivity. The graph shown in the lower side of FIG. 5 shows locations of the screen on the horizontal axis and reflection intensity on the vertical axis. If light is projected onto the screen 12, the intensity of the light reflected back is weakened in a surface having weak reflection intensity. Therefore, uneven brightness occurs and the image quality is deteriorated.

Even in this case, similar to the described above, the light diffused on the irradiated surface (screen 12) that is scanned by the laser module 10 is detected by the light amount detection sensors 3a and 3b which are disposed at a distance of d/2 on the both sides of the laser module 10. The distortion correction calculation unit 7 calculates the intensity values $I_0$ and $I'$ by Expressions 2 to 5 in response to the light intensity received by the light amount receiving unit 6. The laser light source driving unit 5 and the mirror driving unit 4 are driven based on $I_0$ and $I'$.

If there is a boundary at which reflection intensity changes abruptly when the laser is scanned in the horizontal direction as shown in FIG. 5, the distortion correction calculation unit 7 calculates a correction value from the values $I_0$ and $I'$ at this boundary. The correction is performed by matching the reflection intensity with a surface with low reflectivity by multiplying the laser output power of a surface having a high reflectivity by $I_0$ and $I'$. As long as the intensity of $I_0$ can be increased, adjustment is also possible according to the increase. The correction is also possible with respect to the screen of which reflectivity changes smoothly as gradation. Thus, it is possible to reduce uneven brightness by correcting the light intensity even in a surface having different reflectivity.

In addition, color shading correction is also possible by adding a color detection function to the light amount detection sensor 3. For example, an RGB color sensor is used for the light amount detection sensor 3. The color on the screen 12 is detected from the detected color and the wavelength of the used laser.

Figure 6:
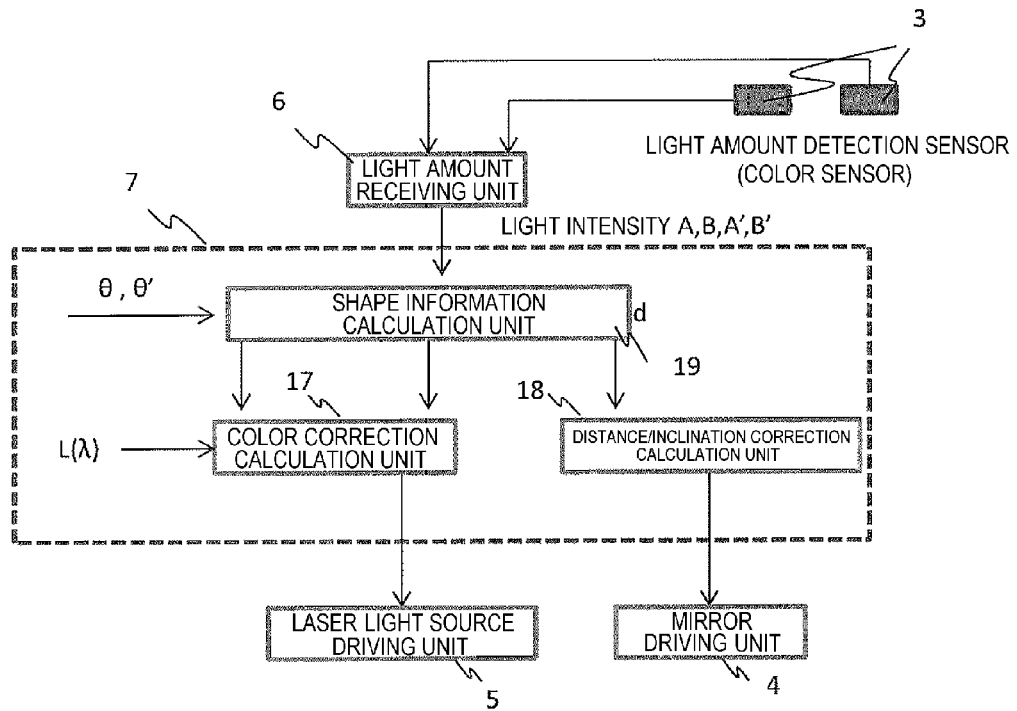
FIG. 6 is a diagram showing a configuration example of a distortion correction calculation unit which performs a color shading correction.

FIG. 6 shows a configuration example of the distortion correction calculation unit 7 which performs the color shading correction. The distortion correction calculation unit 7 includes a shape information calculation unit 19, a color correction calculation unit 17, and a distance/inclination correction calculation unit 18. First, the light amount detection sensor 3 stores the color information of the received RGB in the light amount receiving unit 6 and inputs the value to the shape information calculation unit 19. Color information of RGB or intensities $I_0$ and $I'$ are output from the shape information calculation unit 19 to the color correction calculation unit 17, and the distances L1 and L2 and the inclinations θ and θ' are output to the distance/inclination correction calculation unit 18. The reflection characteristics of the screen 12 are calculated from the spectra $L(\lambda)$ of the laser that has been used in the color correction calculation unit 17, the color information of the obtained RGB and intensities $I_0$ and $I'$ of the respective RGB.

For the detection of the RGB reflection light, the white light is radiated by outputting simultaneously R light, G light, and B light and the reflection light is detected by the light amount detection sensor 3. Alternatively, R light, G light, and B light are separately output and the reflection light of each of the R light, the G light and the B light is detected.

In the manner described above, color shading (color difference) on the screen is determined from the reflection characteristics, and the color correction calculation unit 17 calculates the correction coefficient of the laser intensity of the RGB. The correction coefficient is input to the laser light source driving unit 5 and the laser intensity of the RGB is adjusted depending on the position, thereby reducing the color shading.

The light source may use four kinds of lasers including R, G, and B lasers and an infrared laser. Since the intensity of the infrared region of the sunlight is generally weaker than the visible light, the infrared laser is used for shape detection, even if the reflection light from an object is weak, it is detectable without being buried in the external light. In addition, since detection is performed using the infrared laser which is not visible to the human eye, it is possible to perform an image display by the R, G, and B lasers without affecting the image quality. When only a rough shape correction is performed, the reflection angle variable mirror 2 may be scanned one-dimensionally. The detection time can be shortened by a one-dimensional scanning.

Next, a description will be given of a detection sequence of reading a distance and an inclination and a correction drive of a reflection angle variable mirror after reading the shape of the projected surface (screen).

Figure 7:
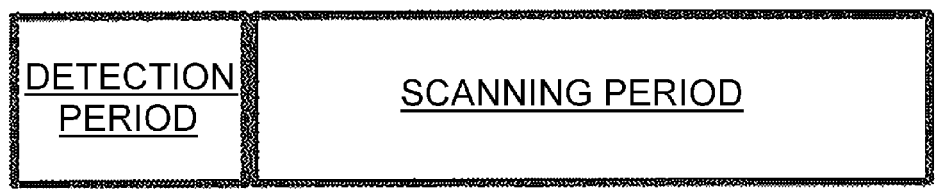
FIG. 7 is a diagram showing a relationship between a detection period and a scanning period.

FIG. 7 is a diagram showing the relationship between a detection period for detecting an inclination and a surface shape of an irradiated surface (screen) and a scanning period for performing an image display. Since the scanning laser and the detection laser are shared in the present embodiment, it is necessary to separate the detection period and the scanning period. The detection period may be one frame or several frames, or a time corresponding to 60 frames. In addition, the detection may be limitedly performed at a device installation time or at a time of start-up of the device.

Only a plurality of points independent of a pixel pitch of an image display (for example, equivalent nine points with respect to the screen) may be detected so as to shorten the detection period. It is needless to say that thinning detection at each line is possible in addition thereto.

When a shape is complex, a scanning speed may be slowed down. It is possible to realize an exact shape reading by increasing the resolution between points irradiated with laser. In addition, when the received light amount of the light amount detection sensor 3 is small and the reading is difficult, it is possible to stop the operation of the laser and to cause a large amount of current to flow to the laser light source 1. The detected light amount of the light amount detection sensor 3 is increased in this manner, and thus the received light intensity of the light amount detection sensor 3 becomes strong.

Further, R, G, and B lasers may be selected and used according to the characteristics of the light amount detection sensor 3 for the laser light source 1 to be used for detection. It is possible to change the laser to be used depending on the used sensor. For example, if a sensor has a high light receiving sensitivity of R, the R laser is used. Since a long wavelength laser is preferable in view of safety, the R laser may be used. Since the amount of reflected light is increased, the G laser may be used.

Next, a method for removing the effect of ambient light of an environment where the irradiation device is used will be described. Not only the light reflected from the irradiated surface (screen) described above but also the ambient light is incident to the light amount detection sensor 3. In such an environment, the light amount detection sensor 3 detects the amount of the superimposed light of the light reflected from the screen 12 and the external light. Therefore, it is not possible to obtain the correct distance and the inclination of the screen 12 in the light amount detected under the environment. Accordingly, the effect of the external light is removed in the following manner.

Figure 8A:
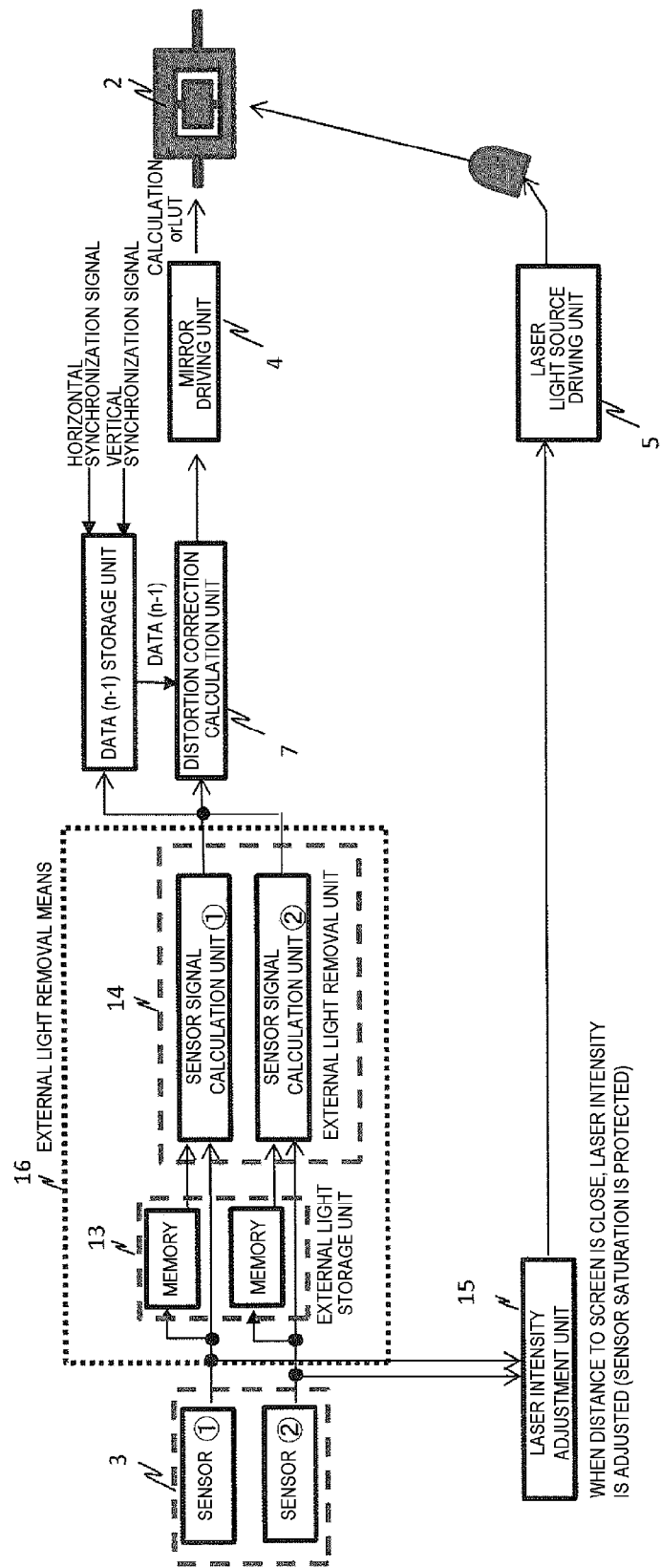
FIG. 8A is a diagram showing an external light removal part.

FIG. 8A shows a configuration of an external light removal part 16. The external light removal part 16 is installed inside the light amount receiving unit 6. The external light removal part 16 is configured of an external light value storage unit 13 and an external light removal unit 14. The external light value storage unit 13 stores the light intensity of the external light detected by the light amount detection sensor 3 in the external light value storage period which will be described later. The external light removal unit 14 calculates the light amount of the light reflected from the irradiated surface (screen) by subtracting the light amount of the external light stored in the external light value storage unit 13 from the light intensity value detected by the light amount detection sensor 3 during the detection period of the shape of the irradiated surface (screen). Then, the calculated value is output to the distortion correction calculation unit 7 in the same manner as described above. Thus, the detection of the inclination and the surface shape of the irradiated surface (screen) is performed without being affected by the external light.

Figure 8B:
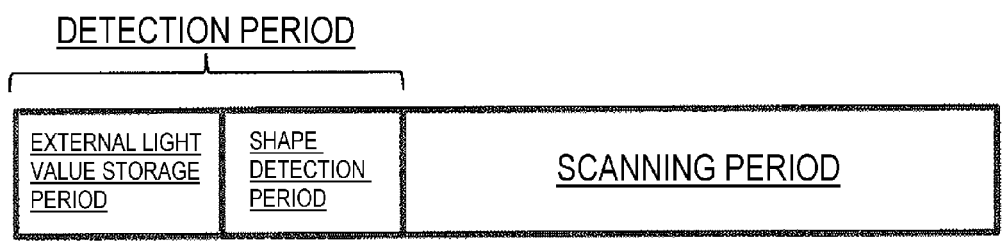
FIG. 8B is a diagram explaining an operation timing of an external light removal.

FIG. 8B is a diagram explaining an operation timing of an external light removal. An external light value storage period is provided in addition to the scanning period for performing an image display described above and the detection period for detecting the inclination and shape of the irradiated surface (screen) which are described above.

First, the light amount detection sensor 3 detects ambient light during the external light value storage period. At this time, light is not radiated from the laser module 10. The detected light is stored in the external light value storage unit 13 of the external light removal part 16. Next, the laser is radiated from the laser module 10 and the shape detection is started during the shape detection period. The light amount detection sensor 3 detects the light reflected on the screen 12. The detected value is input to the external light removal unit 14 and thus it becomes possible to detect the shape of the screen 12 by the light amount detection sensor 3 independent of the external light.

Here, when the position of the screen is close to the laser module 10, there is a possibility that the reflected light is increased and the light amount detection sensor 3 is saturated. Therefore, the value of the light amount detection sensor 3 is input to the laser intensity adjustment unit 15 in FIG. 8A so as to confirm the presence or absence of saturation. When the value exceeds a certain threshold value, an adjustment signal is output from the laser intensity adjustment unit 15 to the laser light source driving unit 5 so as to weaken the intensity of the laser. The intensity of the laser module 10 may be adjusted by the laser light source driving unit 5 to a level at which the light amount detection sensor 3 is not saturated. Thus, the amount of light received by the light amount detection sensor 3 can be optimized.

Next, the arrangement and the number of the light amount detection sensors 3 will be described.

In the detection principle of the distance and the inclination described above, a description has been made assuming that only two light amount detection sensors 3 are disposed in the scanning direction of the laser light, but without being limited thereto, the light amount detection sensor 3 may be disposed at points of two or more. A case may be considered where light is locally radiated to any one of the light amount detection sensors 3 depending on an environment. When only two light amount detection sensors 3 are disposed, the detection of the inclination and the distance may be difficult because one sensor is saturated. If there are a plurality of light amount detection sensors 3, it is possible not to refer to the light amount detection sensor 3 of which output is saturated, thereby preventing the detection accuracy from being deteriorated.

When the light amount detection sensors 3 are disposed two-dimensionally in the horizontal direction and the vertical direction, it is possible to share any one sensor out of two light amount detection sensors 3 disposed in the scanning direction. Accordingly, at least three light amount detection sensors 3 may be disposed at predetermined distances in an L shape.

Figure 9:
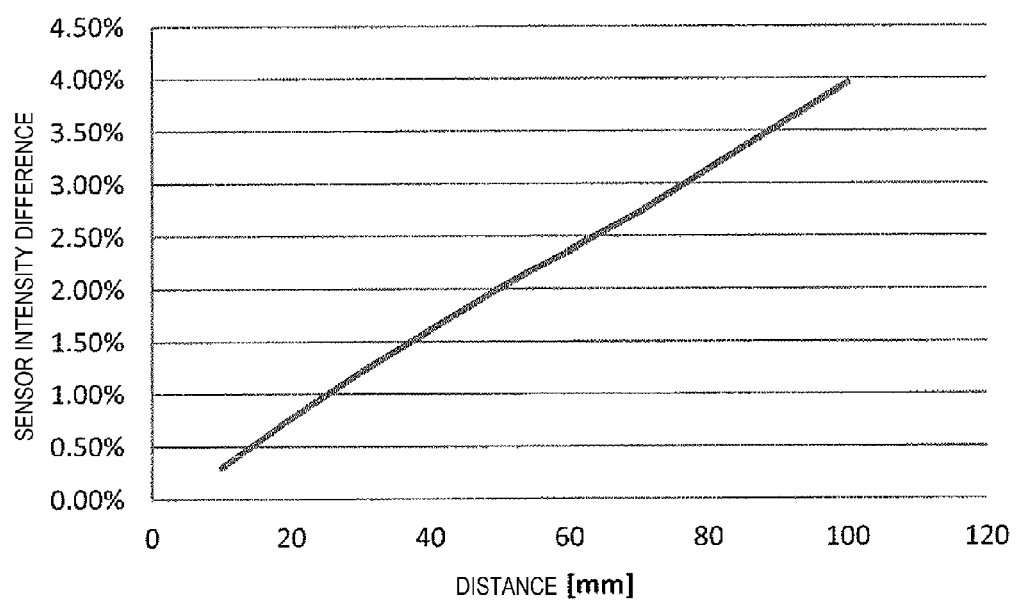
FIG. 9 is a diagram showing a relationship between a distance and an intensity difference between two light amount detection sensors.

In addition, the longer the distance between the light amount detection sensors 3 becomes, the more effective the detection becomes. Since the light amount difference between sensors becomes large, the detection becomes easy. FIG. 9 is a diagram showing a relationship between the distance and the intensity difference between two light amount detection sensors 3. For example, the drawing has been made under the condition of L=1000 mm, d=30 mm, θ=5.71°, and φ=0°. It is possible to confirm from FIG. 9 that keeping a distance between sensors is effective.

Further, it is effective that a lens or the like is provided in the light amount detection sensor 3 so as to have directivity. In this case, the farther the distance becomes, the smaller the amount of light received in the light amount detection sensor 3 becomes. However, since the light can be condensed by the lens, the light amount decrease is prevented and the directivity is increased. Therefore, it is effective to improve the accuracy.

Next, a method will be described which generates a horizontal direction driving signal 201 (H_drive) and a vertical driving signal 202 (V_drive) by a mirror driving unit from signals calculated in the distortion correction calculation unit 7 and performs an image distortion correction.

Figure 10A:
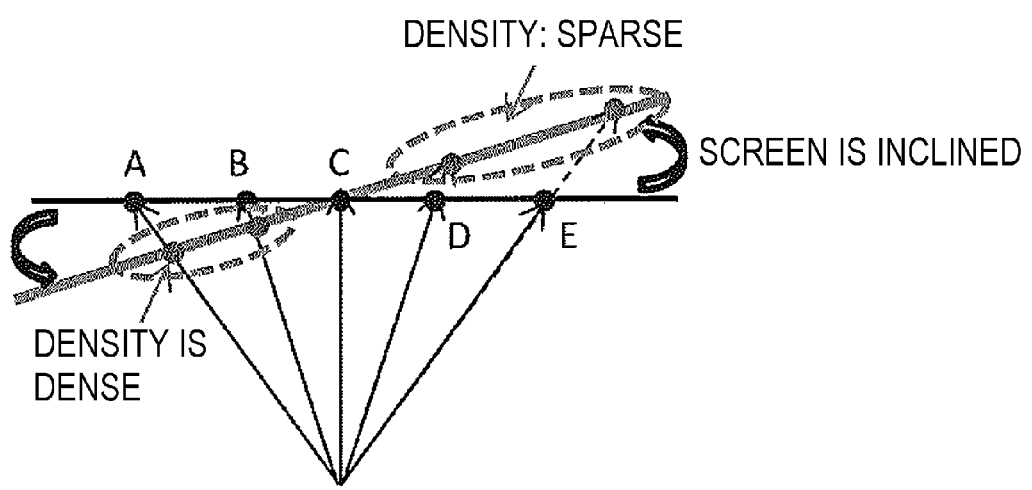
FIG. 10A is a diagram showing a dot density of a laser when a screen is inclined.
Figure 10B:
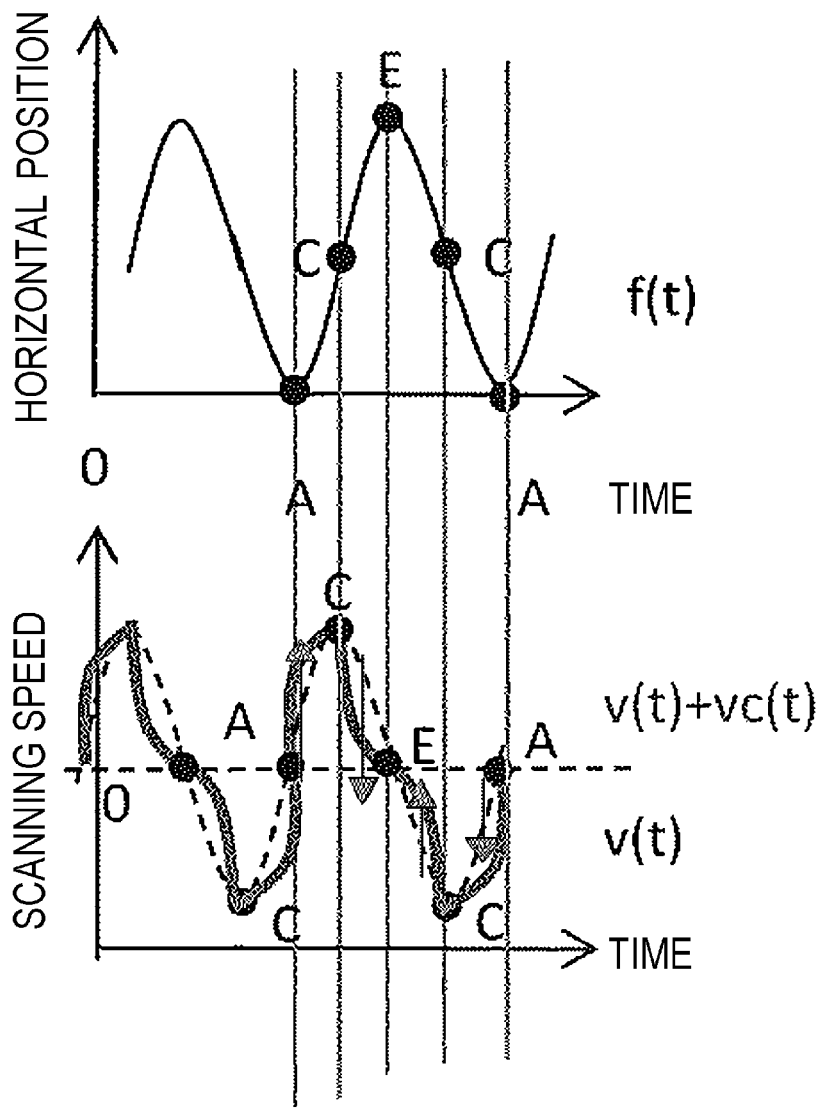
FIG. 10B is a diagram showing correction signals in a horizontal direction for correcting an inclination.
Figure 10D:
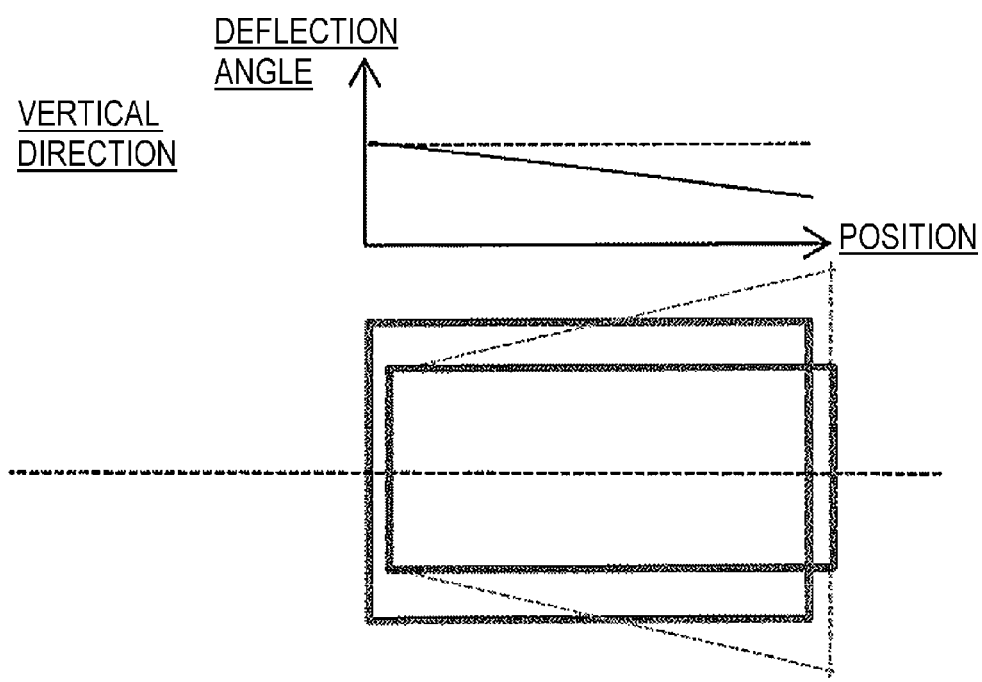
FIG. 10D is a diagram showing another example of the correction method in the vertical direction for correcting the inclination.

FIGS. 10A to 10D are diagrams showing a distortion correction method by a reflection angle variable mirror when the screen is inclined. FIG. 10A shows a dot density of the laser when the screen is inclined, FIG. 10B shows correction signals in the horizontal direction for correcting an inclination, and FIGS. 10C and 10D are diagrams showing an example of a correction method in the vertical direction for correcting the inclination.

In a state where the image pixels on the irradiated surface (screen) are evenly irradiated as shown in FIG. 10A, if inclination occurs in the irradiated surface (screen), as shown in FIG. 10A, the sparseness and denseness of pixels occurs and thus the irradiation image is distorted. In an example shown in FIG. 10A, the left side toward the screen is closer to the observer's side. Therefore, the density of the light irradiating the left side is high and the density decreases toward the right. The correction of irradiated pixel pitch caused by inclination of the irradiated surface (screen) is performed in the following manner.

According to the operation of the reflection angle variable mirror, the horizontal direction in which high speed oscillation is performed is corrected by controlling the scanning speed of the mirror as shown in FIG. 10B, and the vertical direction in which low speed oscillation is performed is corrected by controlling the deflection angle range of the mirror as shown in FIG. 10C. In addition, without the correction control being limited thereto, for example, the horizontal direction may be controlled by changing the laser irradiation timing of a pixel.

In FIG. 10B, the amplitude in the horizontal direction is varied to make the density uniform. Since points A to C have high density, the speed thereof is increased, whereas since points C to E have low density, the speed thereof is reduced. Thus, the correction of a pixel position in the horizontal direction is performed.

FIGS. 10C and 10D show a correction method of the vertical direction in which the angle of the reflection angle variable mirror changes depending on a position. FIG. 10C shows a case where there is a margin in a deflection angle and FIG. 10D shows a case where there is no margin in a deflection angle. In FIG. 10C, a left edge has a large deflection angle. The deflection angle is narrowed toward the right side. Otherwise, when a scanning is performed from the right side to the left side, the deflection angle is shifted in the direction to increase the deflection angle. Although FIG. 10D is similar to FIG. 10C, a maximum deflection angle is used and the scanning from the left to the right side decreases the deflection angle. The scanning from the right to the left side gradually increases the deflection angle.

Although the control described above deals with a case where there is an inclination in the irradiated surface (screen), strictly speaking, even in a case where there is no inclination in the irradiated surface (screen), the irradiation distance to the scanning center part of the laser and the irradiation distance to the scanning end part of the laser are different from each other. Therefore, there is sparseness and denseness in the pixel pitch. As the scanning angle of the laser light is increased, the effect becomes significant. Accordingly, the correction control described above may be performed not only by the size of the calculated inclination φ of the irradiated surface (screen), but also by the range of the calculated irradiation distance (L, L').

What is claimed is:

1. A beam scanning type display apparatus which performs an image display on a screen by two-dimensionally scanning a beam light from a light source, comprising:
   a light source driving unit that drives the light source;
   a reflection angle variable mirror that performs beam scanning by reflecting a beam light from the light source;
   at least two light detectors which detect a light amount of screen reflection light of the beam light, the light detectors being disposed at a predetermined distance in a beam scanning direction of the reflection angle variable mirror, the at least two light detectors being disposed at opposite sides of a scanning direction of an emitting unit that emits a beam light reflected by the reflection angle variable mirror;
   a distortion correction calculation unit that obtains a drive correction value of the reflection angle variable mirror by calculating an irradiation distance to an irradiation point and a screen inclination of the irradiation point, from the light amount of the reflection light which is detected by the light detectors at two different scanning timings and a mirror inclination angle of the reflection angle variable mirror at this time; and
   a mirror driving unit that controls an inclination angle of the reflection angle variable mirror by the drive correction value,
   wherein the drive correction value is obtained at a plurality of timings of a scanning period of beam light, and the beam light is scanned by the reflection angle variable mirror controlled based on the drive correction value.

2. The beam scanning type display apparatus according to claim 1, wherein the mirror drive correction is performed by changing an angle of the reflection angle variable mirror at a predetermined timing by changing a mirror angular speed.

3. The beam scanning type display apparatus according to claim 1, wherein the mirror drive correction is performed by changing an angle of the reflection angle variable mirror at a predetermined timing by changing a deflection angle range of the reflection angle variable mirror.

4. The beam scanning type display apparatus according to claim 1, wherein there are a detection period in which beam light is scanned and a drive correction value of the reflection angle variable mirror is obtained, and a display scanning period in which an image display is performed by scanning a beam light by controlling an inclination angle of the reflection angle variable mirror based on the drive correction value obtained in the detection period.

5. The beam scanning type display apparatus according to claim 4, wherein the reflection angle variable mirror is driven by slowing down a scanning speed in the detection period, and
   different operations of the reflection angle variable mirror are driven in the detection period and the display scanning period.

6. The beam scanning type display apparatus according to claim 1, wherein the distortion correction calculation unit further calculates a light intensity value from the light amount of reflection light detected by the light detectors, and
   the light source driving unit is corrected and driven based on the calculated light intensity value.

7. The beam scanning type display apparatus according to claim 6, wherein the distortion correction calculation unit calculates the light intensity value for each of RGB colors, and
   the light source driving unit respectively corrects and drives RGB light sources based on the calculated light intensity value for each of RGB colors.

8. The beam scanning type display apparatus according to claim 4, wherein the detection period includes an external light removal period for detecting an external light amount, and
   a drive correction value of the reflection angle variable mirror is obtained by a light intensity of reflection light which is obtained by subtracting a light intensity of the external light from a light intensity of screen reflection light of beam light.

9. The beam scanning type display apparatus according to claim 8, wherein the distortion correction calculation unit includes an external light value storage unit that stores a light intensity of an external light detected in the external light removal period,
   the light intensity of the external light detected by the light detectors is stored in the external light storage unit in the external removal period, and
   a drive correction value of the reflection angle variable mirror is obtained by a light intensity of a screen reflection light which is obtained by subtracting the light intensity of the external light stored in the external light storage unit from a light intensity of a screen reflection light of beam light detected by the light detectors in the detection period in which beam light is scanned and the drive correction value of the reflection angle variable mirror is obtained.

10. The beam scanning type display apparatus according to claim 1, wherein the light source includes RGB light sources and an infrared laser, and
    the light detector includes a light receiving element that detects light of an infrared wavelength region, and detects a distance to an irradiation point and an inclination by scanning the infrared laser.

11. The beam scanning type display apparatus according to claim 10, wherein the reflection angle variable mirror performs scanning only in one-dimensional direction when a distance and an inclination are detected.

* * * * *